H. AGAR.
Whiffletrees.
No. 145,826.  Patented Dec. 23, 1873.
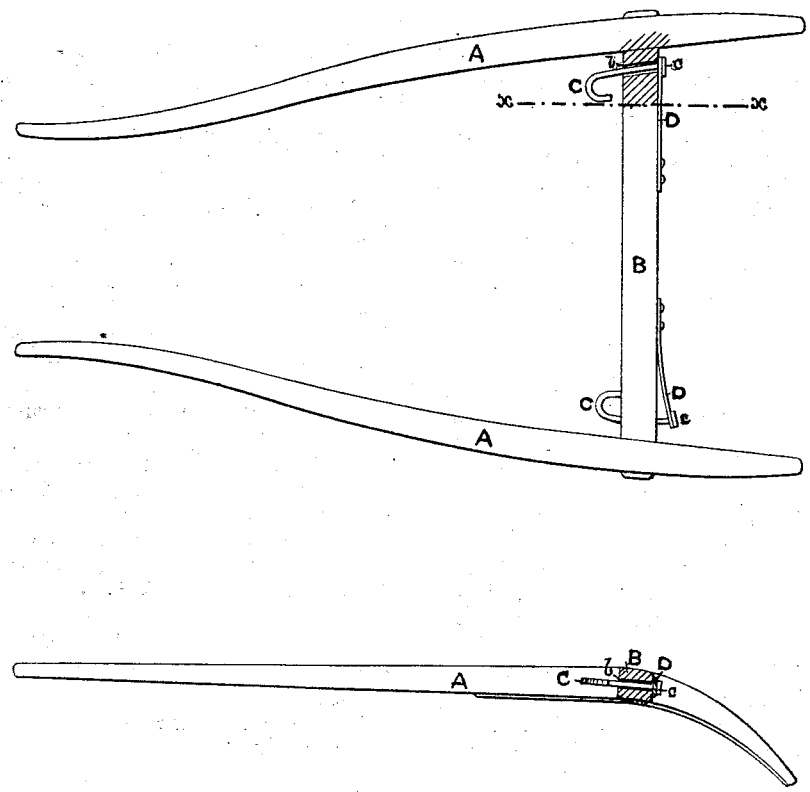

UNITED STATES PATENT OFFICE.

HENRY AGAR, OF BATAVIA, NEW YORK.

IMPROVEMENT IN WHIFFLETREES.

Specification forming part of Letters Patent No. 145,826, dated December 23, 1873; application filed August 19, 1873.

*To all whom it may concern:*

Be it known that I, HENRY AGAR, of Batavia, in the county of Genesee and State of New York, have invented an Improved Cross-Bar for the Thills or Pole of a Carriage, with spring-trace coupling attached thereto, of which the following is a specification:

My invention relates to attaching a spring-trace or tug-fastening to the cross-bar of the thills or pole of a carriage, so as to dispense with whiffletrees, and increase the safety, economy, and lightness of the carriage.

In the accompanying drawings, Figure 1 is a plan view, showing the thills of a wagon with my spring-trace or tug attachment. Fig. 2 is a sectional view of same on the line $x\ x$, Fig. 1.

A A represent the thills; B, the cross-bar which connects them. C C are hooks, to which the traces are attached; they pass through holes or openings $b$, in the cross-bar B, close to the thills, and their rear ends are secured, by nuts $c$, to the free ends of short steel springs D D, the inner ends of which are securely bolted to the rear side of the cross-bar B. The spring holds the hook closely to the bar when there is no draft upon it, and when the tug or trace draws upon the hook it is held there by the tension, but the moment that is withdrawn the spring will bring the hook instantly back to the cross-bar and prevent its being unhooked.

This arrangement dispenses with the use of whiffletrees, and can be used either with thills or the pole of a carriage. It is much stronger, as the attachment is near the end of the cross-bar, whereas whiffletrees are fastened near the middle, and the spring cannot break because it bears upon the cross-bar when in use.

I am aware of the Letters Patent granted to George and William Gibbs, March 10, 1868, which show a double-tree the ends of which are encircled by clevises attached to springs, the latter being secured to the rear of the double-tree, and, therefore, I do not claim such as my invention.

What I claim as my invention is—

The hooks C, passed through the bar B and secured to the springs D, so that their hooked ends will be held against the bar B and prevent the disengagement of the traces when the draft is slackened, as set forth.

HENRY AGAR.

Witnesses:
WILLIAM TYRRELL,
H. U. SOPER.